Patented Feb. 12, 1924.

1,483,798

UNITED STATES PATENT OFFICE.

ARTHUR GEORGE GREEN AND KENNETH HERBERT SAUNDERS, OF MANCHESTER, ENGLAND, ASSIGNORS TO BRITISH DYESTUFFS CORPORATION LIMITED, OF MANCHESTER, ENGLAND.

DYE AND PROCESS OF MAKING THE SAME.

No Drawing.   Application filed July 7, 1923. Serial No. 650,154.

*To all whom it may concern:*

Be it known that we, ARTHUR GEORGE GREEN and KENNETH HERBERT SAUNDERS, subjects of the King of England, and residents of Manchester, in the county of Lancashire, England, have invented certain new and useful Improvements in Dyes and Processes of Making the Same, of which the following is a specification.

In the specification of our application for patent Serial No. 626425 we have described a new process for dyeing and printing material containing or consisting of acetyl cellulose and in this specification we have described but not claimed the production of various dyestuffs, some of new, which are well suited for use in the said new process for dyeing acetyl cellulose.

The present application relates to the manufacture of some of these new dyestuffs suitable for dyeing acetyl cellulose. These are of the diazotizable type and are prepared by sulphide reduction of the compounds obtained by coupling a paranitro-diazo-benzene salt with an alkyl-omega sulphonic acid. The said alkyl-omega sulphonic acids are the reaction products of sodium bisulphite, an aldehyde and an aromatic amine, for instance, the products obtained from sodium bisulphite, formaldehyde and aniline or mono-alkyl aniline.

It is well known (see English Patent No. 11343/1899) that compounds having the general formula $X.N_2.Y.NH.CH_2.SO_3H$, wherein X and Y, respectively, indicate aryl groups or nuclei, can be obtained by combination of diazo compounds with the methyl-omega-sulphonic acids derived from primary amines; that is, amines having an H atom replaced by the methyl-omega-sulfonic acid group. These compounds have however hitherto found no employment in dyeing although they have been used for the preparation of amido-azo compounds by the removal of the methyl-sulphonic group.

We have found that by the careful reduction by means of sodium sulphide of such of these compounds as contain a nitro group in the para position of the nucleus or group indicated by X, diamidoazo compounds in which the methyl-omega-sulphonic radicle remains attached to one of the amido groups are obtained. In view of the great instability of the parent bodies to alkalies, which, according to the above patent commence to split off formaldehyde even in the cold, it would not have been anticipated that it would be resistant to the action of sodium sulfid and that during such action the methyl-sulphonic group would remain intact.

Similarly disazo compounds of the type $X.N_2.Y.N_2.Z.NR.CH_2.SO_3H$ can be obtained and reduced to the corresponding diamido-disazo compounds. In this general formula, X indicates an aryl group containing a nitro group in the para position, R stands for hydrogen or an alkyl group and Y and Z denote aryl groups.

The new dyestuffs as obtained are, as has already been mentioned, particularly adapted for dyeing acetyl cellulose. They are amido-azo dyes solubilized by association therewith of aldehyde and bisulphite groups, so that they are soluble in water and the solution thus formed slowly decomposes when acidified and heated, setting free the aldehyde and sulphur dioxide and yielding the diamido-azo compound, which is taken up by acetyl cellulose, dyeing the same.

The following examples will serve to illustrate further the invention but the invention is not confined to the examples. The parts are by weight.

*Example I.*

13.8 parts of paranitraniline are diazotized and coupled with 20.9 parts of sodium aniline-methyl-omega-sulphonate $C_6H_5NH.CH_2.SO_3Na$. The resultant solution, having a volume of about 1300 parts, is stirred for some time, and carefully neutralized with sodium carbonate, when the greater part of the nitro-azo dyestuff will have separated as a fine suspension. To the cold mixture is then added a cold solution of 50 parts of sodium sulphide crystals in 200 parts of water and stirring is continued at the ordinary temperature for one hour or until a test indicates the completion of the reaction. The dyestuff is then completely precipitated by the addition of common salt, filtered off and carefully dried at a low temperature. Instead of drying it may be preserved as a paste.

The product is soluble in water and dyes "acetyl" silk yellow from a faintly acid bath. It has no affinity for cotton.

*Example II.*

The diazo compound from 13.8 parts of paranitraniline is coupled with 25.3 parts of the sodium salt of amido-para-cresol-methyl-ether-methyl-omega-sulphonic acid (1:4:2) $C_6H_2(CH_3)(OCH_3)NH.CH_2.SO_3Na$ derived from "cresidine" or amido-para-cresol-methyl ether by treatment with formaldehyde and bisulfite. The flocculent red product is reduced by 50 parts of sodium sulphide crystals in the same manner as described in the previous example. The total volume of the mixture being 1500 parts, the reduction product passes completely into solution. By addition of 300 parts of salt the dyestuff is precipitated as an orange precipitate, which is filtered off and carefully dried. It dyes "acetyl" silk yellow but has no affinity for cotton.

We claim—

1. In the manufacture of dyestuffs suitable for dyeing acetyl silk and other purposes, the process which comprises coupling a para-nitro-diazo compound not containing more than two diazo groups with an alkyl-omega-sulphonic acid derivative of an aromatic amine and reducing the paranitro group.

2. In the manufacture of dyestuffs suitable for dyeing acetyl silk and other purposes, the process which comprises coupling a para-nitro-diazo compound not containing more than two diazo groups with a methyl-omega-sulphonic acid derivative of an aromatic amine and reducing the paranitro group.

3. In the manufacture of dyestuffs suitable for dyeing acetyl silk and other purposes, the process which comprises coupling a para-nitro-diazo compound not containing more than two diazo groups with a methyl-omega-sulphonic acid derivative of a primary amine and reducing the para-nitro group.

4. In the manufacture of dyestuffs suitable for dyeing acetyl silk and other purposes, the process which comprises forming a methyl-omega-sulphonic acid derivative of a primary aromatic amine by treatment of such amine with formaldehyde and bisulphite, coupling said acid derivative with a para-nitro-diazo compound not containing more than two diazo groups and effecting sulphide reduction of the para-nitro group.

5. In the manufacture of dyestuffs suitable for dyeing acetyl silk and other purposes, the process which comprises forming a methyl-omega-sulphonic acid derivative of amido-para-cresol-methyl ether (cresidine) by treatment of such cresidine with formaldehyde and bisulphite, coupling said acid derivative with para-nitro-diazo-benzene and effecting sulphide reduction of the paranitro group.

6. The new dyestuff particularly adapted for dyeing acetyl cellulose being an amido-azo dye not containing more than two diazo groups solubilized by association therewith of aldehyde and bisulphite groups and still containing said groups, said dye being soluble in water to form a solution, which slowly decomposes when acidified and heated, setting free aldehyde and sulphur dioxide and yielding a diamido-azo compound capable of being taken up by acetyl cellulose to dye the same.

7. The new dyestuff particularly adapted for dyeing acetyl cellulose being an alkylated amido-azo dye not containing more than two diazo groups solubilized by association therewith of aldehyde and bisulphite groups and still containing said groups, said dye being soluble in water to form solution, which slowly decomposes when acidified and heated, setting free aldehyde and sulphur dioxide and yielding an alkylated diamido-azo compound capable of being taken up by acetyl cellulose to dye the same.

8. The new dyestuff particularly adapted for dyeing acetyl cellulose, being an amido-azo dye not containing more than two diazo groups solubilized by association with one amino group thereof of aldehyde and bisulphite groups and still containing said groups, and containing a further amino group, said dye being soluble in water to form solutions which slowly decompose when acidified and heated, setting free formaldehyde and sulphur dioxide and yielding an amido-azo compound derived from para-phenylene-diamine and cresidine capable of being readily taken up by acetyl cellulose and dyeing the same.

In testimony whereof, we have hereunto affixed our signatures.

ARTHUR GEORGE GREEN.
KENNETH HERBERT SAUNDERS.